(12) United States Patent
Okuwa et al.

(10) Patent No.: US 11,802,513 B2
(45) Date of Patent: Oct. 31, 2023

(54) GAS TURBINE ENGINE HAVING ELECTRICALLY OPERATED ACCESSORY

(71) Applicant: KAWASAKI JUKOGYO KABUSHIKI KAISHA, Kobe (JP)

(72) Inventors: Tatsuya Okuwa, Kobe (JP); Yoshiyasu Shibayama, Kobe (JP); Hikaru Maesato, Kobe (JP); Kazuki Ueta, Kobe (JP); Masahiro Suzuki, Kobe (JP); Tateki Sakimoto, Kobe (JP); Yoshiaki Yuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/638,617

(22) PCT Filed: Aug. 27, 2020

(86) PCT No.: PCT/JP2020/032361
§ 371 (c)(1),
(2) Date: Feb. 25, 2022

(87) PCT Pub. No.: WO2021/039902
PCT Pub. Date: Mar. 4, 2021

(65) Prior Publication Data
US 2022/0290616 A1    Sep. 15, 2022

(30) Foreign Application Priority Data

Aug. 30, 2019  (JP) .................................. 2019-157873

(51) Int. Cl.
*F02C 7/32* (2006.01)
*F01D 15/10* (2006.01)
(Continued)

(52) U.S. Cl.
CPC ................ *F02C 7/32* (2013.01); *F01D 15/10* (2013.01); *F02C 7/06* (2013.01); *F02C 7/36* (2013.01);
(Continued)

(58) Field of Classification Search
CPC ...... F02C 7/06; F02C 7/22; F02C 7/32; F02C 7/36; F01D 15/10; F05D 2220/323;
(Continued)

(56) References Cited

U.S. PATENT DOCUMENTS 3,107,489 A * 10/1963 Palfreyman ............... F02C 7/32
60/39.093
5,832,715 A * 11/1998 Dev ........................ F01D 5/282
60/39.511
(Continued)

FOREIGN PATENT DOCUMENTS

JP    2004-132359 A    4/2004
JP    2006-161653 A    6/2006
(Continued)

OTHER PUBLICATIONS

International Search Report for PCT/JP2020/032361 dated Nov. 2, 2020.
Written Opinion for PCT/JP2020/032361 dated Nov. 2, 2020.

*Primary Examiner* — Steven M Sutherland
(74) *Attorney, Agent, or Firm* — Sughrue Mion, PLLC

(57) ABSTRACT

A gas turbine engine includes: a casing that accommodates a compressor, a combustor, and a turbine; an electric power generator arranged inside the casing and driven by a rotating shaft; an electric power line through which electric power generated by the electric power generator is supplied to an outside of the outer shell; and an electrically-operated accessory that is arranged at an outside of the casing, is driven by
(Continued)

the electric power supplied from the electric power line, and includes an electrically-operated fuel pump.

9 Claims, 2 Drawing Sheets

(51) Int. Cl.
  *F02C 7/06* (2006.01)
  *F02C 7/36* (2006.01)
(52) U.S. Cl.
  CPC .... *F05D 2220/323* (2013.01); *F05D 2220/76* (2013.01); *F05D 2240/35* (2013.01); *F05D 2240/50* (2013.01); *F05D 2240/60* (2013.01)
(58) Field of Classification Search
  CPC ............. F05D 2220/76; F05D 2240/35; F05D 2240/50; F05D 2240/60
  See application file for complete search history.

(56) References Cited

U.S. PATENT DOCUMENTS

| | | |
|---|---|---|
| 2004/0011018 A1 | 1/2004 | Bouiller et al. |
| 2006/0108807 A1 | 5/2006 | Bouiller et al. |
| 2007/0144139 A1 | 6/2007 | Kawamoto et al. |
| 2007/0245706 A1 | 10/2007 | Bell et al. |
| 2011/0198155 A1 | 8/2011 | Charier et al. |
| 2018/0050806 A1 | 2/2018 | Kupiszewski et al. |
| 2018/0058243 A1* | 3/2018 | Auker .................... F02C 7/32 |
| 2018/0354632 A1 | 12/2018 | Hon et al. |

FOREIGN PATENT DOCUMENTS

| | | |
|---|---|---|
| JP | 2014-015083 A | 1/2014 |
| JP | 2014-163407 A | 9/2014 |
| JP | 2019-023068 A | 2/2019 |

\* cited by examiner

GAS TURBINE ENGINE HAVING ELECTRICALLY OPERATED ACCESSORY

CROSS REFERENCE TO RELATED APPLICATIONS

This application is a National Stage of International Application No. PCT/JP2020/032361 filed Aug. 27, 2020, claiming priority based on Japanese Patent Application No. 2019-157873 filed Aug. 30, 2019.

TECHNICAL FIELD

The present disclosure relates to a gas turbine engine in which a compressor, a combustor, and a turbine are arranged so as to be lined up along a rotating shaft.

BACKGROUND ART

Accessories (such as an electric power generator, a fuel pump, and a lubricating oil pump), an accessory gear box, and the like are attached to an outer peripheral surface of a casing of an aircraft gas turbine engine (see PTL 1, for example). The accessories are mechanically driven by utilizing rotational power of a rotating shaft of the engine. Specifically, the rotational power is taken out from the rotating shaft in the casing through a power transmission mechanism to an outside of the casing, is reduced in speed by the accessory gear box, and is transmitted to the accessories.

CITATION LIST

Patent Literature

PTL 1: Japanese Laid-Open Patent Application Publication No. 2004-132359

SUMMARY OF INVENTION

Technical Problem

For example, to suppress air resistance when the gas turbine engine is mounted on an airframe, a frontal projected area of the gas turbine engine needs to be reduced as much as possible, and the gas turbine engine needs to be reduced in size. However, according to current engines, since the accessory gear box disposed on the outer peripheral surface of the casing is large, the frontal projected area of the engine becomes large. The size of the accessory gear box is approximately determined by the size of a gear necessary to obtain a reduction ratio necessary to drive the accessories, and therefore, there is a limit in the size reduction.

An object of the present disclosure is to reduce the size of a gas turbine engine while driving a necessary accessory.

Solution to Problem

A gas turbine engine according to one aspect of the present disclosure is a gas turbine engine in which a compressor, a combustor, and a turbine are arranged so as to be lined up along a rotating shaft. The gas turbine engine includes: a casing that accommodates the compressor, the combustor, and the turbine; an electric power generator arranged inside the casing and driven by the rotating shaft; an electric power line through which electric power generated by the electric power generator is supplied to an outside of the casing; and an electrically-operated accessory that is arranged at the outside of the casing, is driven by the electric power supplied from the electric power line, and includes an electrically-operated fuel pump.

According to the above configuration, the electric power generator is arranged inside the casing of the gas turbine engine, and the generated electric power is guided to the outside of the casing. Therefore, a frontal projected area of the engine can be made smaller than a case where the electric power generator is arranged at the outside of the casing. Moreover, the accessory including a fuel pump arranged at the outside of the casing is an electrically-operated device. Therefore, as compared to a case where the accessory is a mechanically-driven device driven by power extracted from the engine, an accessory gear box can be omitted, and the frontal projected area of the engine can be made smaller. On this account, the engine can be reduced in size while driving the necessary accessory.

A gas turbine engine according to another aspect of the present disclosure is a gas turbine engine in which a low-pressure compressor, a high-pressure compressor, a combustor, a high-pressure turbine, and a low-pressure turbine are arranged so as to be lined up along a rotating shaft. The gas turbine engine includes: a casing that accommodates the low-pressure compressor, the high-pressure compressor, the combustor, the high-pressure turbine, and the low-pressure turbine; and an electric power generator arranged inside the casing and driven by the rotating shaft. The low-pressure compressor is an axial flow compressor. The high-pressure compressor is a centrifugal compressor. A tubular body connecting the axial flow compressor and the centrifugal compressor decreases in diameter in a direction from the axial flow compressor toward the centrifugal compressor. The electric power generator is arranged at a radially inner side of the tubular body so as to be located between the axial flow compressor and the centrifugal compressor.

According to the above configuration, the entire engine can be effectively reduced in size by using the axial flow compressor as the low-pressure compressor and devising the arrangement of the electric power generator while reducing the size of the high-pressure compressor by using the centrifugal compressor.

Advantageous Effects of Invention

According to the present disclosure, the gas turbine engine can be reduced in size while driving the necessary accessory.

DESCRIPTION OF EMBODIMENTS

Hereinafter, an embodiment will be described with reference to the drawings. In the following description, a "front side" denotes an upstream side in a direction in which air flows in an engine, and a "rear side" denotes a downstream side in the direction in which the air flows in the engine. To be specific, the "front side" denotes a side where a fan is disposed, in an axial direction of a rotating shaft of the engine, and the "rear side" denotes a side opposite to the side where the fan is disposed, in the axial direction of the rotating shaft of the engine. A "radial direction" denotes a direction orthogonal to a rotation axis of the rotating shaft of the engine. A "circumferential direction" denotes a direction around the rotation axis of the rotating shaft of the engine. Moreover, in the present description, an "aircraft" is a concept including an airplane, an unmanned flying object, and the like each of which flies by propulsive force generated by a gas turbine.

Figure 1:
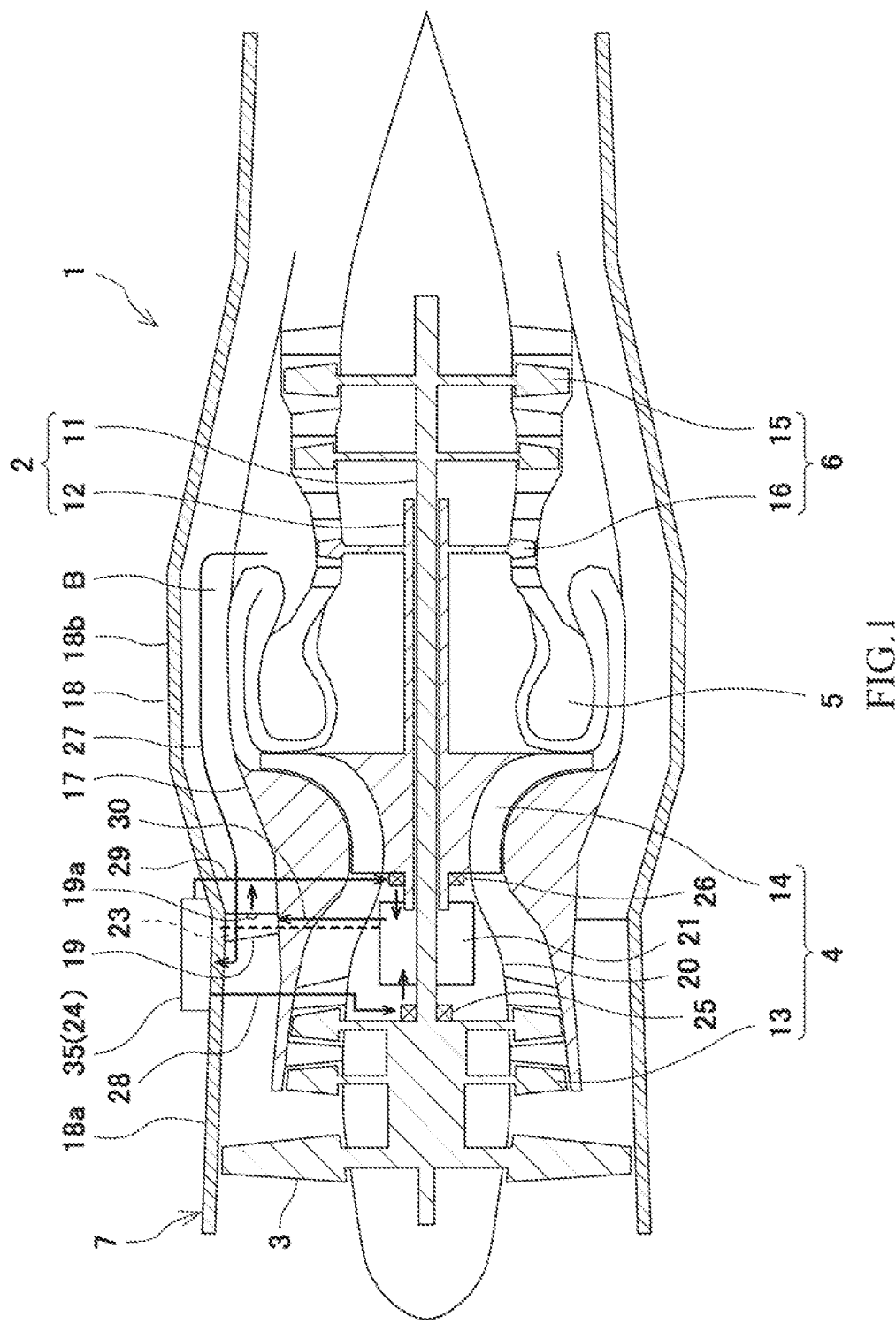
FIG. 1 is a sectional view of an aircraft gas turbine engine according to an embodiment.
Figure 2:
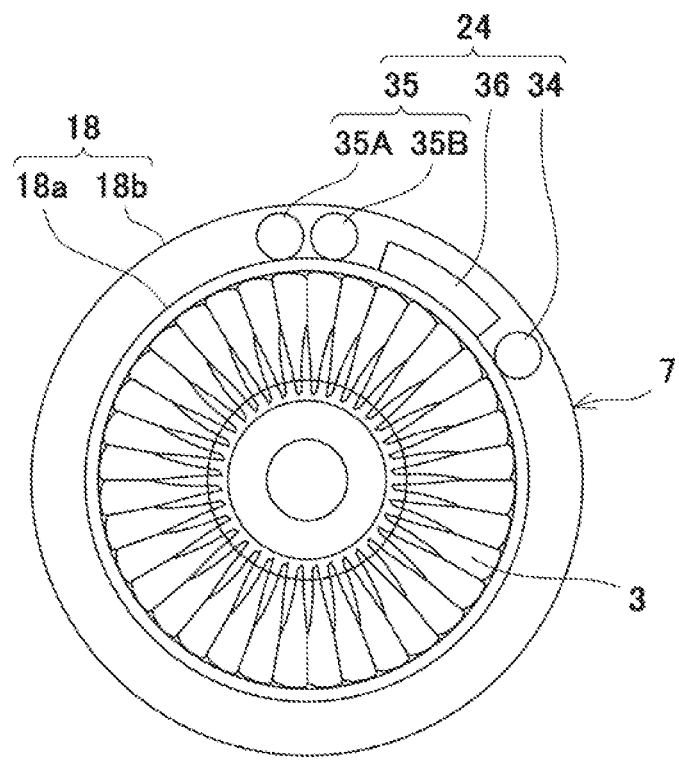
FIG. 2 is a front view of the gas turbine engine of FIG. 1 when viewed from the front.

FIG. 1 is a sectional view of an aircraft gas turbine engine 1 according to the embodiment. FIG. 2 is a front view of the gas turbine engine 1 of FIG. 1 when viewed from the front. The present embodiment describes the aircraft gas turbine engine but is not especially limited. As shown in FIG. 1, the aircraft the gas turbine engine 1 includes a rotating shaft 2, a fan 3, a compressor 4, a combustor 5, a turbine 6, and a casing 7. The rotating shaft 2 extends in a front-rear direction of the gas turbine engine 1. The fan 3 is connected to a front portion of the rotating shaft 2 and rotates together with the rotating shaft 2. The compressor 4, the combustor 5, and the turbine 6 are lined up along the rotating shaft 2 in this order from the front side to the rear side. The casing 7 is a tubular object having an axis that coincides with a rotation axis of the rotating shaft 2. The casing 7 accommodates the rotating shaft 2, the fan 3, the compressor 4, the combustor 5, and the turbine 6.

Specifically, the gas turbine engine 1 is a two-shaft gas turbine engine. The compressor 4 includes a low-pressure compressor 13 and a high-pressure compressor 14 arranged behind the low-pressure compressor 13. For example, the low-pressure compressor 13 is an axial flow compressor, and the high-pressure compressor 14 is a centrifugal compressor. However, the type of the low-pressure compressor 13 and the type of the high-pressure compressor 14 are not limited to these. The turbine 6 includes a low-pressure turbine 15 and a high-pressure turbine 16 arranged in front of the low-pressure turbine 15. The rotating shaft 2 includes a low-pressure shaft 11 and a high-pressure shaft 12. The low-pressure shaft 11 couples the low-pressure compressor 13 to the low-pressure turbine 15, and the high-pressure shaft 12 couples the high-pressure compressor 14 to the high-pressure turbine 16. The high-pressure shaft 12 is a tubular shaft including a hollow space therein. The low-pressure shaft 11 is inserted into the hollow space of the high-pressure shaft 12. The low-pressure turbine 16 is coupled to the fan 3 through the low-pressure shaft 11.

The casing 7 includes an inner shell 17, an outer shell 18, and a strut 19. The inner shell 17 has a substantially cylindrical shape and accommodates the compressor 4, the combustor 5, and the turbine 6. The outer shell 18 has a substantially cylindrical shape and is arranged concentrically with the inner shell 17 so as to be spaced apart from the inner shell 17 outward in the radial direction. A cylindrical bypass passage B exists between the inner shell 17 and the outer shell 18. Part of the air sucked by the fan 3 flows through the bypass passage B and is discharged to the rear side.

The strut 19 extends from the inner shell 17 to the outer shell 18 in the radial direction and couples the inner shell 17 to the outer shell 18. The strut 19 is arranged behind the low-pressure compressor 13. Specifically, the strut 19 is disposed between the low-pressure compressor 13 and the high-pressure compressor 14. Although there exists no strut in front of the strut 19, a strut may be provided.

A tubular body 20 connecting the low-pressure compressor 13 (axial flow compressor) and the high-pressure compressor 14 (centrifugal compressor) decreases in diameter in a direction from the low-pressure compressor 13 toward the high-pressure compressor 14. The tubular body 20 defines an inner peripheral edge of a passage through which compressed air flows from the low-pressure compressor 13 toward the high-pressure compressor 14. An electric power generator 21 is arranged inside the casing 7. Specifically, the electric power generator 21 is arranged inside the tubular body 20. The electric power generator 21 is accommodated in the tubular body 20 and arranged between the low-pressure compressor 13 and the high-pressure compressor 14. The electric power generator 21 is connected to the rotating shaft 2 and is driven by the rotating shaft 2 to generate electric power. A rotation axis of the electric power generator 21 coincides with a rotation axis of the rotating shaft 2.

An electric power line 23 for electric power supply is connected to the electric power generator 21. The electric power line 23 extends from the electric power generator 21 outward in the radial direction to reach an outside of the outer shell 18. The electric power line 23 extends along the strut 19. Specifically, the electric power line 23 passes through an internal space of the strut 19 in the radial direction. The electric power generated by the electric power generator 21 is supplied through the electric power line 23 to electrically-operated accessories 24 arranged at the outside of (the outer shell 18 of) the casing 7.

As shown in FIGS. 1 and 2, an outer peripheral surface of the casing 7 includes a first region 18a and a second region 18b. The electrically-operated accessories 24 are disposed in the first region 18a, and the second region 18b is located behind the first region 18a. The first region 18a is smaller in diameter than the second region 18b. The first region 18a is located at a position corresponding to at least the low-pressure compressor 13 in the front-rear direction (rotation axis direction). The second region 18b is located at a position corresponding to at least the combustor 5 in the front-rear direction (rotation axis direction). The electrically-operated accessories 24 are arranged at a radially inner side of an outer peripheral surface of the second region 18b when viewed from the front. A region connecting the first region 18a and the second region 18b may be, for example, an inclined region that gradually increases in diameter toward the rear side.

The electrically-operated accessories 24 are arranged along an outer peripheral surface of the first region 18a of the outer shell 18. The electrically-operated accessories 24 operate by the electric power supplied through the electric power line 23. The electrically-operated accessories 24 include an electrically-operated fuel pump 34, an oil mist generator 35, and a controller 36. The electrically-operated fuel pump 34 supplies fuel of a fuel tank (not shown) to the combustor 5. The oil mist generator 35 generates oil mist by mixing oil with compressed air compressed by the compressor 4. The controller 36 controls the electrically-operated fuel pump 34 and the oil mist generator 35 in accordance with predetermined sensor data and an external command.

For example, the oil mist generator 35 includes a first electrically-operated lubricating oil pump 35A and a second electrically-operated lubricating oil pump 35B each of which mixes oil of a lubricating oil tank (not shown) with the compressed air extracted from the compressor 4. The first electrically-operated lubricating oil pump 35A and the second electrically-operated lubricating oil pump 35B are lined up in the circumferential direction along an outer peripheral surface of the outer shell 18 of the casing 7. An extraction passage 27 is connected to the first electrically-operated lubricating oil pump 35A and the second electrically-operated lubricating oil pump 35B. The extraction passage 27 is a passage through which the compressed air extracted from the compressor 4 flows. For example, the extraction passage 27 extracts the compressed air, compressed by the high-pressure compressor 14, from between the high-pressure compressor 14 and the high-pressure turbine 16. In this case, the extraction passage 27 passes through the bypass passage B in the front-rear direction and is connected to the oil mist generator 35.

The first electrically-operated lubricating oil pump 35A generates the oil mist by discharging a slight amount of oil to the compressed air supplied from the extraction passage 27, and the oil mist is guided to a first passage 28. The second electrically-operated lubricating oil pump 35B generates the oil mist by discharging a slight amount of oil to the compressed air supplied from the extraction passage 27, and the oil mist is guided to a second passage 29. To be specific, the compressed air located downstream of the low-pressure compressor 13 and upstream of the high-pressure compressor 14 flows into the first passage 28 and the second passage 29.

A first bearing 25 and a second bearing 26 are arranged along the rotating shaft 2 at both respective sides of the electric power generator 21 in the front-rear direction. The first bearing 25 supports the low-pressure shaft 11, and the second bearing 26 supports the high-pressure shaft 12. The first passage 28 supplies the oil mist to the first bearing 25 to lubricate the first bearing 25. The second passage 29 supplies the oil mist to the second bearing 26 to lubricate the second bearing 26. The first passage 28 guides the oil mist such that the oil mist lubricates the first bearing 25 and then cools the electric power generator 21. The second passage 29 guides the oil mist such that the oil mist lubricates the second bearing 26 and then cools the electric power generator 21.

The oil mist that has cooled the electric power generator 21 is guided to a discharge passage 30. An inlet of the discharge passage 30 communicates with an inside of a housing 33 (see FIG. 3) of the electric power generator 21. An outlet of the discharge passage 30 communicates with a discharge port 19a of the strut 19. The discharge port 19a of the strut 19 is open toward the bypass passage B. To be specific, the oil mist having flowed through the discharge passage 30 is discharged to the bypass passage B. Each of the extraction passage 27, the first passage 28, the second passage 29, and the discharge passage 30 may be formed by a pipe, a casing, a housing, or the like.

Figure 3:
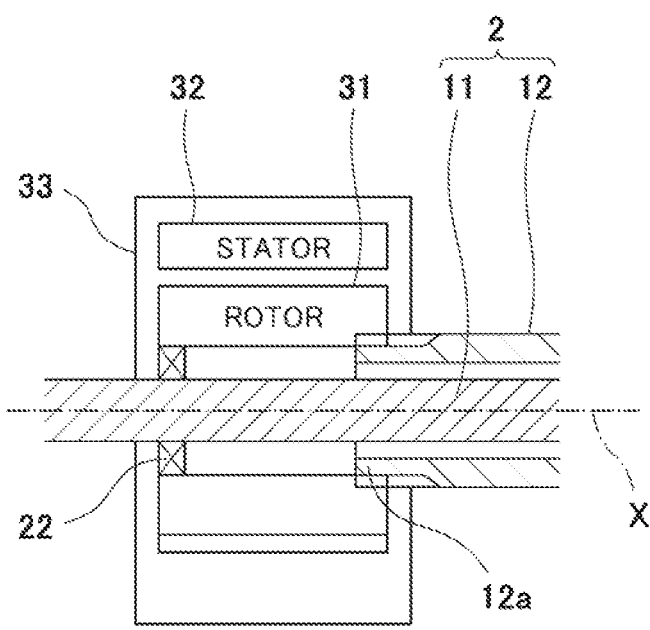
FIG. 3 is an enlarged sectional view schematically showing an electric power generator of the gas turbine engine of FIG. 1 and its vicinity.

FIG. 3 is an enlarged sectional view schematically showing the electric power generator 21 of the gas turbine engine 1 of FIG. 1 and its vicinity. As shown in FIG. 3, the electric power generator 21 includes a rotor 31, a stator 32 arranged outside the rotor 31 in the radial direction, and the housing 33 accommodating the rotor 31 and the stator 32. A rotation axis X of the rotor 31 coincides with a rotation axis of the rotating shaft 2. A front end portion of the high-pressure shaft 12 is inserted into a hollow space of the rotor 31 on the rotation axis X of the rotor 31 and is coupled to a rear portion of the rotor 31 such that the high-pressure shaft 12 and the rotor 31 rotate together. For example, the front end portion of the high-pressure shaft 12 is directly connected (for example, splined) to an inner peripheral surface of the rotor 31. A front end of the high-pressure shaft 12 terminates inside the electric power generator 21 in a direction along the rotation axis X. A front portion of the rotor 31 is supported by the low-pressure shaft 11 through a rotor bearing 22 such that the rotor 31 is rotatable.

According to the above-described configuration, the electric power generator 21 is arranged inside the casing 7 of the gas turbine engine 1, and the generated electric power is guided to the outside of the casing 7. Therefore, a frontal projected area of the gas turbine engine 1 can be made smaller than a case where the electric power generator 21 is arranged at the outside of the casing 7. Moreover, the accessories 24 arranged at the outside of the casing 7 are electrically-operated devices. Therefore, as compared to a case where the accessories are mechanically-driven devices driven by power extracted from the gas turbine engine, an accessory gear box can be omitted, and the frontal projected area of the gas turbine engine 1 can be made smaller. On this account, the gas turbine engine 1 can be reduced in size while driving the necessary accessory 24.

Moreover, regarding the outer shell 18 of the casing 7, the first region 18a at which the electrically-operated accessories 24 are disposed is reduced in diameter. Therefore, the amounts of projection of the electrically-operated accessories 24 outward in the radial direction from the casing 7 when viewed from the front can be made small, and the frontal projected area of the gas turbine engine 1 can be reduced.

Moreover, the oil mist generator 35 is arranged at the outside of the casing 7 and is an electrically-operated device. Therefore, as compared to a case where a lubricating oil supply device is mechanically driven by power extracted from the gas turbine engine, the accessory gear box can be omitted, and the frontal projected area of the gas turbine engine 1 can be reduced.

Moreover, the first bearing 25, the electric power generator 21, and the second bearing 26 are lined up in this order from the front side, and the oil mist first lubricates the first bearing 25 and the second bearing 26 and then cools the electric power generator 21. Therefore, as compared to a case where the oil mist simply flows from the front side to the rear side (from the first bearing 25 through the electric power generator 21 toward the second bearing 26), the temperature increase of the oil mist supplied to the second bearing 26 can be prevented.

Moreover, since the oil mist generator 35 includes the electrically-operated lubricating oil pumps 35A and 35B (not a single lubricating oil pump), each of the electrically-operated lubricating oil pumps 35A and 35B can be reduced in diameter. Since the electrically-operated lubricating oil pumps 35A and 35B that are reduced in diameter are lined up in the circumferential direction along the outer peripheral surface of the casing 7, the amounts of projection of the electrically-operated lubricating oil pumps 35A and 35B outward in the radial direction from the casing 7 when viewed from the front can be made small, and the frontal projected area of the gas turbine engine 1 can be reduced. Moreover, since the oil mist (not oil jet) is used to lubricate the first bearing 25 and the second bearing 26, discharge amounts of the electrically-operated lubricating oil pumps 35A and 35B can be minimized, and therefore, the electrically-operated lubricating oil pumps 35A and 35B can be reduced in size.

Moreover, the extraction passage 27 through which the compressed air is supplied to the oil mist generator 35 is connected to a portion between the high-pressure compressor 14 and the high-pressure turbine 16. The compressed air flowing into the extraction passage 27 is high in temperature, but the extraction passage 27 is cooled by the bypass passage B. Therefore, the extracted air that reaches the oil mist generator 35 is prevented from increasing in temperature. On this account, the oil mist is prevented from increasing in temperature, and the electric power generator 21 can be suitably cooled.

Moreover, since the electric power generator 21 is driven by the high-pressure shaft 12, the electric power generator 21 can stably generate electric power even in an idling state. Furthermore, since the front portion of the rotor 31 is supported by the low-pressure shaft 11, the high-pressure shaft 12 does not have to be increased in length, and a weight increase of the gas turbine engine 1 can be prevented. Moreover, since a front end portion 12a of the high-pressure shaft 12 is inserted into the hollow space of the rotor 31 and is coupled to the rotor 31, a complex power transmission structure is unnecessary.

Moreover, the strut 19 includes the discharge port 19a, and the oil mist that has lubricated the first bearing 25 and the second bearing 26 and then cooled the electric power generator 21 is discharged from the discharge port 19a to the bypass passage B. Therefore, the oil mist is ejected to the rear side together with bypass air, and this contributes to propulsive force of the gas turbine engine 1.

Moreover, since the electric power line 23 extends along the strut 19 extending from the inner shell 17 to the outer shell 18, the electric power generated by the electric power generator 21 can be easily guided to the outside of the casing 7. Furthermore, since the strut 19 is arranged behind the low-pressure compressor 13, aerodynamic performance can be made higher than a case where the strut is disposed in the vicinity of the fan 3.

Moreover, the electric power generator 21 is arranged inside the tubular body 20 so as to be located between the axial flow compressor (low-pressure compressor 13) and the centrifugal compressor (high-pressure compressor 14). Therefore, the entire gas turbine engine 1 can be effectively reduced in size by using the axial flow compressor as the low-pressure compressor 13 and devising the arrangement of the electric power generator 21 while reducing the size of the high-pressure compressor 14 by using the centrifugal compressor.

REFERENCE SIGNS LIST

1 gas turbine engine
2 rotating shaft
3 fan
4 compressor
5 combustor
6 turbine
7 casing
11 low-pressure shaft
12 high-pressure shaft
13 low-pressure compressor
14 high-pressure compressor
15 low-pressure turbine
16 high-pressure turbine
17 inner shell
18 outer shell
18a first region
18b second region
19 strut
19a discharge port
20 tubular body
21 electric power generator
23 electric power line
24 electrically-operated accessory
25 first bearing
26 second bearing
27 extraction passage
28 first passage
29 second passage
30 discharge passage
31 rotor
32 stator
34 electrically-operated fuel pump
35 oil mist generator
35A first electrically-operated lubricating oil pump
35B second electrically-operated lubricating oil pump
B bypass passage

The invention claimed is:

1. A gas turbine engine comprising,
a casing that accommodates a compressor, a combustor, and a turbine;
an electric power generator inside the casing, the electric power generator being driven by a rotating shaft;
an electric power line which supplies electric power generated by the electric power generator to an outside of the casing; and
an electrically-operated accessory at the outside of the casing, the electrically-operated accessory being driven by the electric power supplied from the electric power line, and includes an electrically-operated fuel pump, wherein:
an outer peripheral surface of the casing includes
a first region at which the electrically-operated accessory is disposed, and
a second region located behind the first region;
the first region is smaller in diameter than the second region; and
the electrically-operated accessory is arranged at a radially inner side of an outer peripheral surface of the second region when viewed from a front of the gas turbine engine.

2. A gas turbine engine comprising,
a casing that accommodates a compressor, a combustor, and a turbine;
an electric power generator inside the casing, the electric power generator being driven by a rotating shaft;
an electric power line which supplies electric power generated by the electric power generator to an outside of the casing;
an electrically-operated accessory at the outside of the casing, the electrically-operated accessory being driven by the electric power supplied from the electric power line, and includes an electrically-operated fuel pump;
a first bearing and a second bearing along the rotating shaft;
a first passage through which oil mist that lubricates the first bearing flows; and
a second passage through which the oil mist that lubricates the second bearing flows, wherein
the electrically-operated accessory includes an oil mist generator that generates the oil mist by mixing oil with compressed air compressed by the compressor.

3. The gas turbine engine according to claim 2, wherein:
the first bearing and the second bearing are at both respective sides of the electric power generator along the rotating shaft;
the first passage guides the oil mist such that the oil mist lubricates the first bearing and then cools the electric power generator; and
the second passage guides the oil mist such that the oil mist lubricates the second bearing and then cools the electric power generator.

4. The gas turbine engine according to claim 2, wherein:
the oil mist generator includes
   a first electrically-operated lubricating oil pump that discharges oil to air compressed by the compressor to generate the oil mist to be guided to the first passage and
   a second electrically-operated lubricating oil pump that discharges the oil to the air compressed by the compressor to generate the oil mist to be guided to the second passage; and
the first electrically-operated lubricating oil pump and the second electrically-operated lubricating oil pump are lined up in a circumferential direction along an outer peripheral surface of the casing.

5. The gas turbine engine according to claim 2, further comprising a discharge passage through which the oil mist that has cooled the electric power generator flows, wherein:
the casing includes
   an inner shell, an outer shell, and a strut; and
   a bypass passage through which air flows, the bypass passage existing between the inner shell and the outer shell, wherein
the strut extends from the inner shell to the outer shell and includes a discharge port through which the oil mist flowing through the discharge passage is discharged to the bypass passage.

6. A gas turbine engine comprising,
a casing that accommodates a compressor, a combustor, and a turbine;
an electric power generator inside the casing, the electric power generator being driven by a rotating shaft;
an electric power line which supplies electric power generated by the electric power generator to an outside of the casing;
an electrically-operated accessory at the outside of the casing, the electrically-operated accessory being driven by the electric power supplied from the electric power line, and includes an electrically-operated fuel pump; wherein:
the compressor includes a low-pressure compressor and a high-pressure compressor;
the turbine includes a low-pressure turbine and a high-pressure turbine;
the rotating shaft includes
   a low-pressure shaft connected to the low-pressure compressor and the low-pressure turbine and
   a high-pressure shaft connected to the high-pressure compressor and the high-pressure turbine;
the electric power generator includes a stator and a rotor arranged at a radially inner side of the stator;
a front end portion of the high-pressure shaft is inserted into a hollow space of the rotor on a rotation axis of the rotor and is coupled to a rear portion of the rotor such that the high-pressure shaft and the rotor rotate together; and
a front portion of the rotor is supported by the low-pressure shaft such that the rotor is rotatable.

7. A gas turbine engine comprising,
a casing that accommodates a compressor, a combustor, and a turbine;
an electric power generator inside the casing, the electric power generator being driven by a rotating shaft;
an electric power line which supplies electric power generated by the electric power generator to an outside of the casing;
an electrically-operated accessory at the outside of the casing, the electrically-operated accessory being driven by the electric power supplied from the electric power line, and includes an electrically-operated fuel pump; wherein:
the casing includes
   an inner shell, an outer shell, and a strut; and
   a bypass passage through which air flows exists between the inner shell and the outer shell, wherein
the strut extends from the inner shell to the outer shell; and
the electric power line extends along the strut.

8. The gas turbine engine according to claim 7, wherein the strut is behind the compressor.

9. A gas turbine engine comprising,
a casing that accommodates a compressor, a combustor, and a turbine;
an electric power generator inside the casing, the electric power generator being driven by a rotating shaft;
an electric power line which supplies electric power generated by the electric power generator to an outside of the casing;
an electrically-operated accessory at the outside of the casing, the electrically-operated accessory being driven by the electric power supplied from the electric power line, and includes an electrically-operated fuel pump; wherein:
the compressor includes a low-pressure compressor and a high-pressure compressor;
the turbine includes a low-pressure turbine and a high-pressure turbine;
the rotating shaft includes
a low-pressure shaft connected to the low-pressure compressor and the low-pressure turbine and
a high-pressure shaft connected to the high-pressure compressor and the high-pressure turbine;
the low-pressure compressor is an axial flow compressor;
the high-pressure compressor is a centrifugal compressor;
a tubular body connecting the axial flow compressor and the centrifugal compressor decreases in diameter in a direction from the axial flow compressor toward the centrifugal compressor; and
the electric power generator is inside the tubular body and between the axial flow compressor and the centrifugal compressor.

* * * * *